Patented Nov. 2, 1937

2,097,590

UNITED STATES PATENT OFFICE 2,097,590

MANUFACTURE OF VINYL COMPOUNDS

Henry Dreyfus, London, England

No Drawing. Original application March 24, 1932, Serial No. 601,060. Divided and this application June 17, 1933, Serial No. 676,334. In Great Britain March 30, 1931

10 Claims. (Cl. 260—2)

This invention relates to the manufacture of compounds containing a vinyl residue or a polyvinyl residue, the present application being a division of my co-pending application Serial Number 601,060 filed 24th March, 1932.

In accordance with the present invention valuable vinyl compounds are obtained by a reaction of a compound containing the grouping

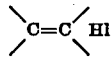

(where Hl=halogen) and in particular a vinyl halide $CH_2=CH.Hl$ and a compound containing a replaceable hydrogen atom and in addition at least one hydroxy group or one carboxy, sulphonic or amino or other acidic or basic or other groups which tend to render compounds containing them more readily soluble or dispersible in aqueous liquids than compounds devoid of such groups. Such groups are hereinafter referred to as "hydrophile" groups. The compounds prepared according to the invention are characterized by containing a hydrophile group. The replaceable hydrogen may be present in a hydroxy, carboxy, or amino group. As examples of compounds suitable for use as starting materials and containing a replaceable hydrogen and a hydrophile group mention may be made of hydroxycarboxylic acids, di- or poly-carboxylic acids, sulpho-carboxylic acids, or amino carboxylic acids, whether of the aliphatic, aromatic or other series. As examples of such acids may be mentioned glycollic acid, citric acid, tartaric acid, malic acid, mandelic acid, oxalic acid, succinic acid, maleic acid, benzene di- or poly-carboxylic acids, e. g. phthalic acid, hydroxybenzene carboxylic acids, sulphobenzene carboxylic acids, and amino benzene carboxylic acids.

The reaction may be effected in the presence of substances binding acid or, where hydroxyl or carboxyl groups are required to react, the compounds may be employed in the form of alkali or other metal derivatives. Thus sodium salts of glycol, glycerol or glycollic acid may be allowed to react with vinyl chloride in such proportions as to yield vinyl derivatives containing hydroxyl or carboxyl groups.

Instead of a vinyl halide other compounds containing the grouping

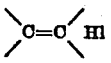

may be employed for example β-chlor-propylene.

The vinyl compounds containing hydrophile groups, obtainable in the aforementioned manner, may be polymerized by subjecting them to the action of heat and/or light in the presence or absence of diluents, and in the presence or absence of substances facilitating the reaction, for instance organic peroxides such as a benzoyl peroxide. If desired, mixtures of two or more of the new compounds or of one or more of the new compounds with another vinyl compound may be polymerized, whereby products may be obtained of character varying according to the proportions of the different compounds employed.

The invention is illustrated but not limited by the following examples:—

Example 1

25 parts of metallic sodium are dissolved in about 250 parts of glycol contained in an autoclave provided with stirring mechanism. 70 parts of vinyl chloride are then introduced and the whole heated, while stirring, for several hours to 80–100° C. until the pressure in the autoclave ceases to fall materially. After cooling, and preferably after separation from the sodium chloride formed, the glycol monovinyl ether is, by virtue of its lower boiling point, isolated from the excess of glycol by distillation under diminished pressure.

The fraction boiling at 110°–150° C. may be directly utilized for conversion by polymerization into a solid product readily dispersed in water. For this purpose the fraction in question is mixed with about 0.5 to 1 per cent. of its weight of benzoyl peroxide and subjected, while warming under a reflux condenser, to the radiation from a quartz mercury vapour lamp. The polymerized product may be taken up in water and used directly for sizing purposes.

Example 2

150 parts of dry succinic acid monopotassium salt, 400 parts of toluene and 65 parts of vinyl chloride are heated in an autoclave, while well stirring, to 100 to 130° C. until the pressure ceases to fall appreciably. The reaction product is then filtered to remove the potassium chloride formed and the toluene is distilled off from the higher boiling vinyl succinic ester under reduced pressure.

By replacing the vinyl chloride in the foregoing examples by the equivalent quantity of β-chloropropylene the corresponding methyl substituted vinyl compounds may be prepared.

What I claim and desire to secure by Letters Patent is:—

1. Process for the production of vinyl compounds, which comprises the interaction of a compound of the formula

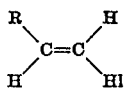

wherein Hl is a halogen, and R is a radicle of the group consisting of hydrogen and methyl, with a saturated organic compound containing an acid group and in addition at least one hydrophile group, so as to obtain products containing hydrophile groups.

2. Process for the production of vinyl compounds, which comprises the interaction of a compound of the formula

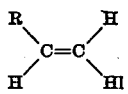

wherein Hl is a halogen, and R is a radicle of the group consisting of hydrogen and methyl, with a saturated organic compound containing an acid group and in addition at least one hydrophile group, so as to obtain products containing hydrophile groups, and at least partially polymerizing the reaction product.

3. Process for the production of vinyl compounds, which comprises the interaction of a vinyl halide with a saturated organic compound containing at least two acid groups, so as to obtain products containing acid groups.

4. Process for the production of vinyl compounds, which comprises the interaction of a vinyl halide with a saturated organic compound containing at least two acid groups, so as to obtain products containing acid groups, and at least partially polymerizing the reaction product.

5. Process for the production of vinyl compounds, which comprises the interaction of a vinyl halide with an acid salt of a saturated organic compound, said compound containing at least two acid groups.

6. Process for the production of vinyl compounds, which comprises the interaction of a vinyl halide with an acid salt of a saturated organic compound, said compound containing at least two acid groups, and at least partially polymerizing the reaction product.

7. Process for the production of vinyl compounds, which comprises the interaction of a vinyl halide with an acid salt of succinic acid.

8. Process for the production of polyvinyl compounds, which comprises interacting a vinyl halide with an acid salt of a saturated organic compound, said organic compound containing at least two acid groups, and at least partially polymerizing the reaction product.

9. Process for the production of vinyl compounds, which comprises the interaction of a vinyl halide with a saturated organic compound containing an acid group and in addition at least one hydrophile group, so as to obtain products containing hydrophile groups.

10. Process for the production of vinyl compounds, which comprises the interaction of a vinyl halide with a saturated organic compound containing an acid group and in addition at least one hydrophile group, so as to obtain products containing hydrophile groups, and at least partially polymerizing the reaction product.

HENRY DREYFUS.